United States Patent [19]
Bohlen et al.

[11] Patent Number: 4,722,398
[45] Date of Patent: Feb. 2, 1988

[54] RETARDING DEPOSITION OF PARAFFIN FROM CRUDE OIL OR NATURAL GAS WITH ALKALINE LIQUIDS

[75] Inventors: David S. Bohlen, Falcon Heights, Minn.; William J. Settineri, Midland, Mich.

[73] Assignee: Dowell Schlumberger Incorporated, Tulsa, Okla.

[21] Appl. No.: 837,436

[22] Filed: Mar. 7, 1986

[51] Int. Cl.⁴ .......................... E21B 37/06; B08B 7/04
[52] U.S. Cl. ................... 166/304; 134/22.13; 134/29; 252/8.3; 252/8.552
[58] Field of Search ............. 252/8.552, 8.3; 166/304; 134/22.13, 29, 22.11

[56] References Cited

U.S. PATENT DOCUMENTS

| | | | |
|---|---|---|---|
| 2,817,635 | 12/1957 | Goldman et al. | 252/855 |
| 2,818,079 | 2/1954 | Garrison | 137/1 |
| 3,067,134 | 12/1962 | Parks et al. | 252/8.3 |
| 3,162,601 | 12/1964 | Jones | 252/8.3 |
| 3,244,188 | 4/1966 | Parks et al. | 137/1.5 |
| 3,693,720 | 9/1972 | McDougall et al. | 166/304 |
| 4,099,537 | 12/1978 | Kalfoglou et al. | 137/13 |
| 4,455,175 | 6/1984 | Settineri et al. | 134/5 |
| 4,536,222 | 8/1985 | Settineri et al. | 134/5 |

FOREIGN PATENT DOCUMENTS 960597 1/1985 Canada .
960726 1/1985 Canada .

OTHER PUBLICATIONS

Paraffin Inhibition Treatments Reduce Well Maintenance, by J. G. Charles, SPE Paper 13362, Oct.-Nov. 1984.

*Primary Examiner*—Herbert B. Guynn

[57] ABSTRACT

An improved method for inhibiting the deposition of paraffins on the surface of equipment in contact with crude oil or natural gas streams containing paraffins. The deposition of paraffins may be reduced by first contacting the equipment with a sulfur trioxide containing fluid and then adding an aqueous solution containing hydroxyl ions to the crude oil or natural gas streams containing paraffins which are in contact with the equipment.

11 Claims, 1 Drawing Figure

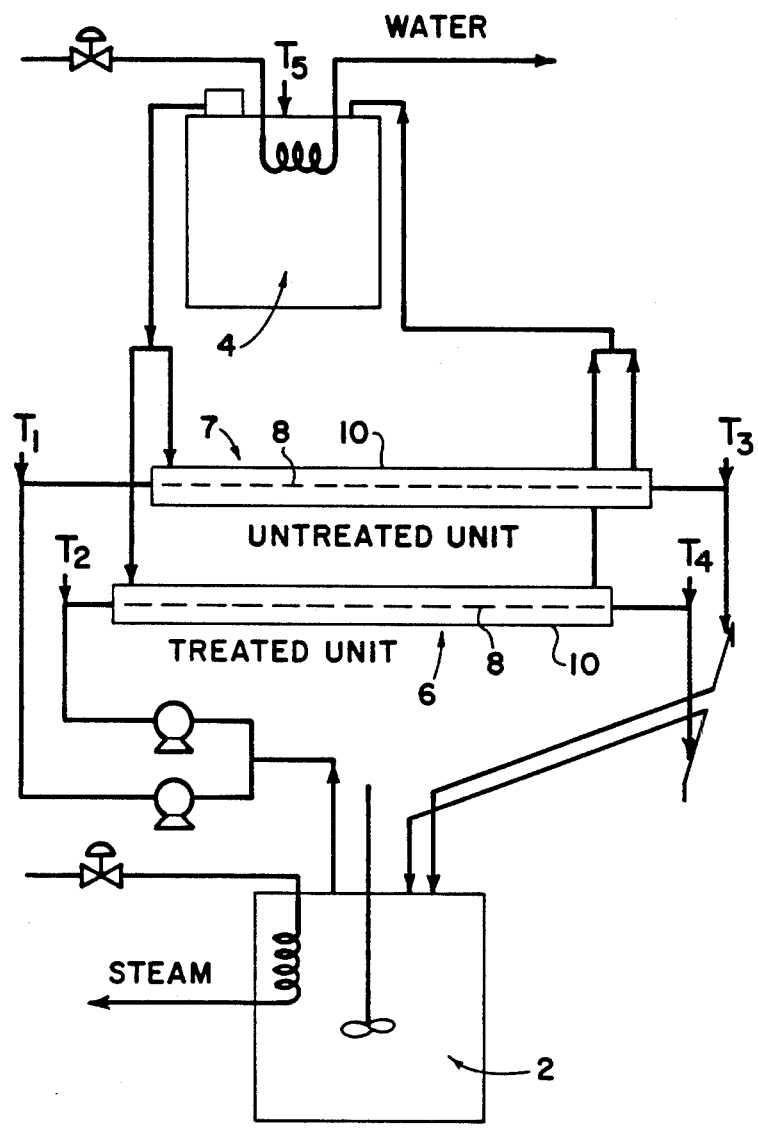

RETARDING DEPOSITION OF PARAFFIN FROM CRUDE OIL OR NATURAL GAS WITH ALKALINE LIQUIDS

BACKGROUND OF THE INVENTION

A long standing problem in the production, handling, storage and transportation of crude oil is the depositing out of hydrocarbons on the surfaces of such equipment. These hydrocarbons are dissolved in the crude oil at the comparatively high temperatures of underground formations at which most production, handling, storage and transfer equipment are maintained. A similar problem can occur in the production, transport, etc. of natural gas when condensate containing these insoluble hydrocarbons forms as the temperature of the natural gas is lowered. The accumulation of these hydrocarbons, such as waxes, asphaltenes and resins (herein collectively referred to as paraffins), can restrict the flow of oil or natural gas through the equipment and ultimately result in partial or complete plugging. For example, as crude oil is pumped from a production well through production tubing, paraffins deposit on the inner surface of such tubing as the crude oil cools. Similarly, in the transport of crude oils containing soluble paraffins, flow in pipe lines can be restricted by the deposition of these paraffins as the crude oil cools during transport.

Several methods have been used to remove these paraffin deposits including mechanically scraping the equipment surfaces, contacting the paraffin deposits with various organic solvent systems and the application of hot oils or external heat.

Therefore, it would be desirable to provide a system to further inhibit such paraffin deposits which may be utilized without taking the equipment out of service.

SUMMARY OF THE INVENTION

The present invention stems from the discovery of the beneficial effects of adding an aqueous solution containing hydroxyl ions to a crude oil or natural gas stream containing paraffins to inhibit the deposition of said paraffins on the equipment in contact with the crude oil or natural gas streams containing paraffins after the said equipment has been rendered water-wettable.

In one aspect, the present invention is a method for inhibiting the deposition of paraffins on the surface of equipment in contact with crude oil or natural gas streams containing such paraffins. The method comprises first rendering the equipment surface water-wettable and then adding an aqueous alkaline liquid containing hydroxyl ions to the crude oil or natural gas stream containing paraffins in an amount sufficient to inhibit the deposition of said paraffins on the equipment in contact with the crude oil or natural gas streams.

A preferred embodiment of this aspect of the present invention comprises first rendering the surface of the equipment water-wettable by contacting the said equipment surfaces with a sulfur trioxide-containing fluid and thereafter rinsing the surface with an aqueous alkaline liquid. Following this treatment, an aqueous liquid is added to the crude oil or natural gas stream containing paraffins to inhibit the deposition of said paraffins on the equipment in contact with the crude oil or natural gas streams.

The aqueous liquid used can include water, or alkaline solutions (such as sodium hydroxide solution). The aqueous liquid can further include brines, to which alkaline compounds may or may not have been added, providing the brine does not produce sufficient amounts of precipitate to inhibit oil or gas flow any substantial amount.

DETAILED DESCRIPTION OF THE INVENTION

The present invention relates to an improved method for retarding the deposition of paraffins on the surface of equipment in contact with crude oils or natural gases containing such paraffins, wherein the said surface of the equipment is first contacted with a fluid and thereafter rinsed with an aqueous liquid under conditions whereby the equipment surfaces are rendered water-wettable.

For the purposes of this invention, the term "paraffins" means those hydrocarbons such as waxes, asphaltenes, and resins which are dissolved in the crude oil or natural gas at the comparatively high temperatures of underground formations, but are insoluble to varying degrees at the temperatures which most production, handling, storage, and transfer equipment are maintained, thus causing the paraffins to deposit out on the said equipment. By the term "water-wettable" is meant a surface which preferentially attracts water to its surface instead of paraffins. Such a surface is characterized by water forming a film on the surface rather than beading upon the surface.

The improvement of the present invention comprises a subsequent addition of an aqueous solution containing hydroxyl ions to the crude oil or natural gas stream containing paraffins which is in contact with the equipment after the said equipment has been contacted with a fluid and rinsed by an aqueous liquid to render the equipment surfaces water-wettable. The aqueous solution containing hydroxyl ions is added in sufficient amounts to inhibit the deposition of the paraffins on the said equipment in contact with the crude oil or natural gas stream containing paraffins.

The crude oils and natural gases which may be treated by the process of this invention include those found in underground or subsurface reservoirs, including those found in nature. Typically, naturally occurring crude oils and natural gases may contain a wide variety of paraffins which may deposit out of the crude oil or natural gas streams containing such paraffins as the temperature is lowered.

As the crude oil stream containing paraffins or natural gas is transported by conduits, or preferably upward in the casing of a crude oil or natural gas well, the paraffins may begin to precipitate out as the temperature approaches the wax deposition temperature. For purposes of this invention, the term "wax deposition temperature" is the cloud point of the crude oil or natural gas streams containing paraffins as determined by ASTM Test D-9757. The precipitating paraffins may rigidly adhere to the equipment surfaces and form layers of increasing thickness on the equipment surface. As the deposits become thicker the flow of the crude oil or natural gas through the constricted conduit may decrease to undesirable rates.

In the practice of the present invention, the equipment in contact with the crude oil or natural gas stream is contacted with a fluid and thereafter rinsed with an aqueous liquid whereby the equipment surfaces are rendered water-wettable. The fluid which is utilized to contact the equipment surfaces is preferably a sulfur trioxide containing fluid. Such a method of rendering the equipment surfaces water-wettable is fully disclosed in U.S. Pat. No. 4,455,175, issued June 19, 1984, to Settineri et al., which is incorporated herein as a reference.

After the treatment discussed hereinabove whereby the equipment surfaces are rendered water-wettable, an aqueous hydroxyl containing liquid is added to the crude oil or natural gas stream containing paraffins in an amount sufficient to inhibit the deposition of paraffins on the equipment surfaces. Preferably the hydroxyl containing liquid has a hydroxyl ion concentration between about $10^{-5}$ moles per liter, and about 10 moles per liter, and most preferably about 0.0025 moles per liter to about 2.5 moles per liter.

The said aqueous hydroxyl containing solution is most preferably a solution containing sodium hydroxide. The amount of sodium hydroxide in the solution is preferably from about 0.004 to about 35 weight percent of the solution, and most preferably from about 0.01 to about 10 weight percent of the solution.

The aqueous sodium hydroxide solution may be added directly to the crude oil or natural gas stream containing paraffins in an amount ranging from about 0.01 to about 3.0 volume percent or more of the said crude oil or natural gas streams containing paraffins.

The method of this invention has use in both the production and transportation equipment of crude oil or natural gas wells wherein the said crude oil or natural gas contains paraffins.

The improvement of the present invention whereby the deposition of paraffins on the said equipment is inhibited is quantitatively measured as a function of the overall heat transfer coefficient of an experimental piping system (see FIG. I). That is, an increasing paraffin deposit on the equipment surface decreases the heat loss from the crude oil or natural gas stream of the experimental system. Therefore, the overall heat transfer coefficient ($U_T$) is found to be higher at a given time for a system that is subjected to the practice of the present invention compared to an untreated system wherein the crude oil stream does not contain an aqueous solution of sodium hydroxide.

The following example is provided to illustrate the invention, but is not intended to limit the scope thereof.

EXAMPLE

The improvement of the present invention whereby the deposition of paraffins on equipment surfaces in contact with crude oil or natural gas streams containing said paraffins was quantitatively measured using the following illustrated system.

The laboratory flow loop illustrated schematically in the FIGURE was used to simulate conditions of equipment surfaces in contact with crude oil or natural gas, for example crude oil or natural gas carrying pipes. In the loop, a hydrocarbon-paraffin solution was circulated from a constant temperature reservoir 2 through an inner tube 8 of each of a tube unit 6 and a tube unit 7. Water was circulated from a constant temperature water reservoir 4 through an annulus 10 of each tube unit 6, 7 to cool each inner tube 8. Inlet temperatures $T_1$, $T_2$ and outlet temperatures $T_3$, $T_4$ were recorded.

An increasing paraffin wax deposit in the tubes decreases the rate of heat flow from the hydrocarbon fluid in the inner tube 8 to the surrounding cooling water. Inlet and outlet temperatures of the two fluids could therefore be used to calculate the change in resistance to heat flow. This can be used as a method to monitor wax buildup.

The equation used to calculate U, the overall heat transfer coefficient, was $$U = m \int_{T\,inlet}^{T\,outlet} Cpdt/Ai\, \Delta T \text{ log mean}$$

where
U=overall heat transfer coefficient watts/(meter$^2$) (°C.)
Ai=surface area of each inner tubing (0.0472 meter$^2$)
m=mass of mixture through the tubing per second (grams/second)
$\Delta T$ log mean=logarithmic mean temperature difference $$\int_{T\,inlet}^{T\,outlet} Cpdt = \text{heat removed from mixture Joules/gram}$$

In this Example, inner tube 8 of unit 6, was treated with sulfur trioxide at room temperature by injecting approximately 15 ml of liquid sulfur trioxide into the tube and capping the ends shut. Contact time was 30 minutes. A water flush was applied to remove any residual sulfur trioxide. Both inner tubes 8 were then rinsed with four weight percent aqueous sodium hydroxide. The tubes were then reconnected to the remainder of the apparatus of the FIGURE. Twenty milliliters of the aqueous sodium hydroxide was added to each inner tube 8. One hundred milliliters was added to reservoir 2 to insure that the aqueous phase was continuously being added to the system with the oil. A mixture of eleven weight percent crude paraffin in kerosene oil with a cloud point of 47° C. was used as the hydrocarbon-paraffin solution circulated from reservoir 2.

Table I shows that the overall heat transfer coefficient for the treated inner tube 8 of unit 6 did not decrease as quickly as did the coefficient for the untreated inner tube 8 of unit 7. This indicates that the treated inner tube did not foul as quickly as the untreated inner tube.

Various modifications and alterations to the above described embodiments of the invention, which are still within the scope of the invention, will be evident to those skilled in the art. Accordingly, the scope of the present invention is to be determined from the attached claims, read in light to the above description.

TABLE I

| | | Comparison of Fouling Characteristics | | | | | | | |
| | | TREATED INNER TUBE | | | | UNTREATED INNER TUBE | | | |
| | | Temp. °C. | | Heat Lost | | Temp. °C. | | Heat Lost | |
| Time (hrs) | Cooling Water (°C.) | Inlet | Outlet | J/gm | U | Inlet | Outlet | J/gm | U |
| 1 | 28.5 | 51.0 | 33.0 | 43.2 | 55.3 | 50.25 | 37.75 | 42.2 | 56.4 |
| 2 | 28.75 | 50.75 | 33.50 | 41.5 | 52.7 | 50.0 | 33.0 | 41.0 | 55.7 |
| 3 | 28.75 | 49.75 | 32.5 | 41.7 | 59.8 | 48.5 | 33.25 | 37.0 | 51.5 |
| 4 | 29.0 | 49.25 | 33.5 | 38.1 | 52.2 | 48.5 | 34.0 | 35.2 | 47.3 |

TABLE I-continued

Comparison of Fouling Characteristics

| Time (hrs) | Cooling Water (°C.) | TREATED INNER TUBE | | | | UNTREATED INNER TUBE | | | |
|---|---|---|---|---|---|---|---|---|---|
| | | Temp. °C. | | Heat Lost | | Temp. °C. | | Heat Lost | |
| | | Inlet | Outlet | J/gm | U | Inlet | Outlet | J/gm | U |
| 5 | 29.0 | 49.25 | 34.25 | 36.3 | 46.7 | 48.5 | 35.0 | 32.8 | 40.9 |
| 6 | 29.0 | 49.0 | 35.0 | 33.9 | 41.7 | 48.25 | 35.75 | 30.4 | 36.3 |
| 7 | 29.0 | 48.75 | 35.5 | 32.1 | 38.5 | 48.25 | 36.25 | 29.2 | 33.8 |
| 8 | 29.0 | 48.25 | 35.75 | 30.4 | 36.3 | 48.0 | 36.5 | 28.0 | 32.2 |
| 9 | 29.0 | 48.0 | 36.0 | 29.2 | 34.6 | 48.0 | 37.0 | 26.7 | 29.9 |
| 10 | 29.0 | 48.0 | 36.25 | 28.6 | 33.4 | 48.0 | 37.25 | 26.1 | 28.8 |
| 11 | 29.25 | 48.0 | 36.75 | 27.3 | 31.7 | 48.0 | 37.5 | 25.5 | 28.4 |
| 12 | 29.25 | 48.0 | 37.0 | 26.7 | 30.6 | 48.0 | 38.0 | 24.2 | 26.3 |

What is claimed is:

1. An improvement in a method for retarding the deposition of paraffins on the surface of equipment in contact with crude oils or natural gases containing such paraffins wherein the said surface of the equipment is first contacted with a fluid and thereafter rinsed with an aqueous liquid under conditions whereby the equipment surfaces are rendered water-wettable, the improvement comprises: subsequent addition of an aqueous alkaline liquid consisting essentially of water and sodium hydroxide to the crude oil or natural gas stream containing paraffins which are in contact with the equipment after the said equipment has been contacted with a fluid and rinsed by an aqueous liquid to render the equipment surfaces water-wettable, the aqueous alkaline liquid being added in sufficient amounts to inhibit the deposition of the paraffins on the said equipment in contact with the crude oil or natural gas stream containing paraffins.

2. The method of claim 1 wherein the hydroxyl ion concentration in said liquid is between about $10^{-5}$ moles per liter to about 10 moles per liter.

3. The method of claim 1 wherein the hydroxyl ion concentration is between about 0.0025 moles per liter to about 2.5 moles per liter.

4. The method of claim 1 wherein the said liquid containing sodium hydroxide is a solution containing from about 0.004 weight percent to about 35 weight percent sodium hydroxide.

5. The method of claim 1 wherein the said liquid containing sodium hydroxide is a solution liquid containing from about 0.01 weight percent to about 10 weight percent sodium hydroxide.

6. The method of claim 1 wherein the said containing sodium hydroxide is added to the crude oil or natural gas stream containing paraffins in an amount ranging from about 0.01 volume percent to about 3.0 volume percent of the said crude oil or natural gas stream containing paraffins.

7. The method of claim 1 wherein the said equipment is natural gas producing equipment.

8. The method of claim 1 wherein the said equipment is a oil producing equipment.

9. The method of claim 1 wherein the said equipment is an oil transportation line.

10. The method of claim 1 wherein the said equipment is a natural gas transportation line.

11. The method of claim 1 wherein the said fluid which renders the equipment surface water-wettable is a sulfur trioxide-containing fluid.

* * * * *